Feb. 6, 1951    M. McMATH ET AL    2,540,132
MACHINE FOR ROLLING AND SETTING LEATHER
Filed March 30, 1948    5 Sheets-Sheet 3
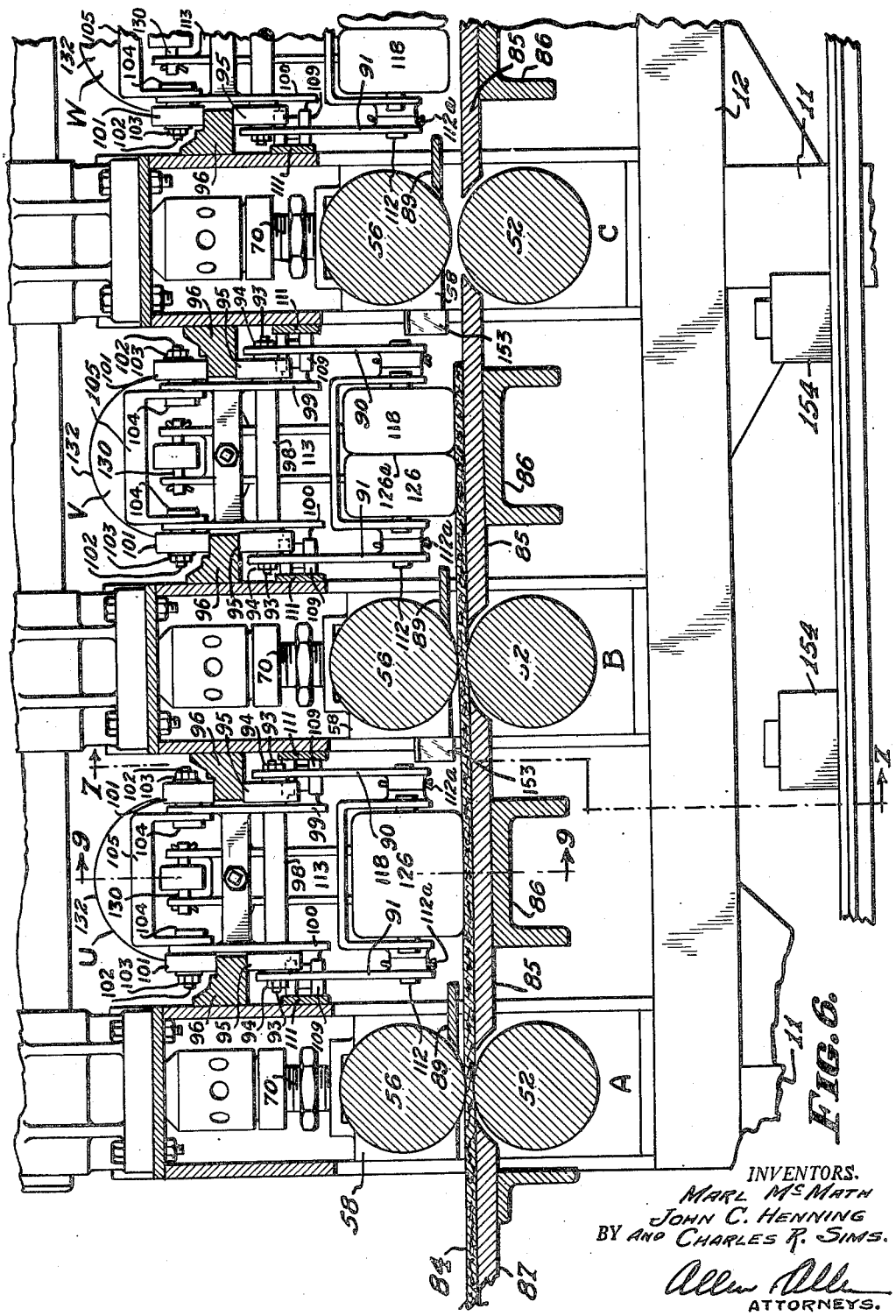
INVENTORS.
MARL McMATH
JOHN C. HENNING
BY AND CHARLES R. SIMS.
Allen Allen
ATTORNEYS.

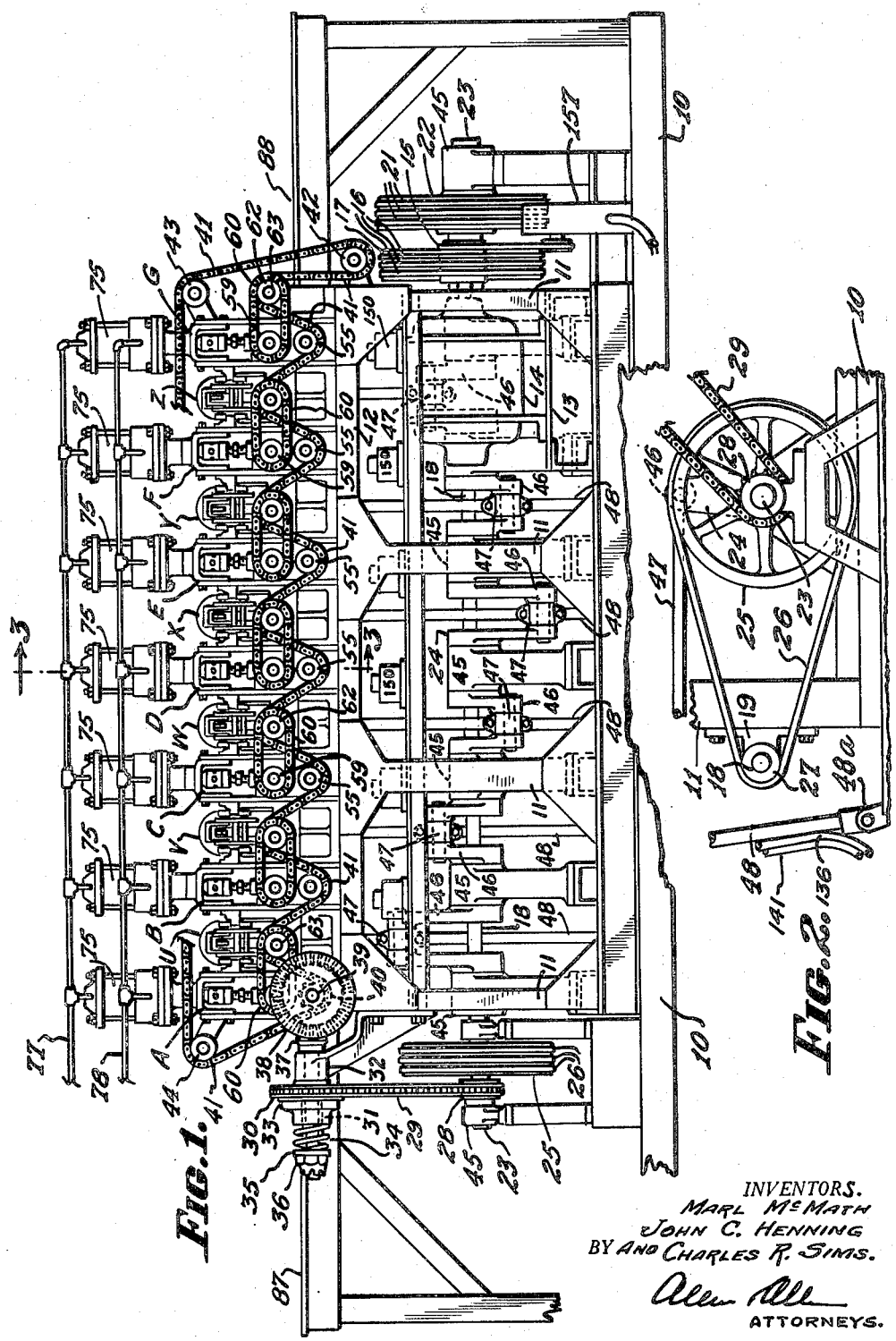

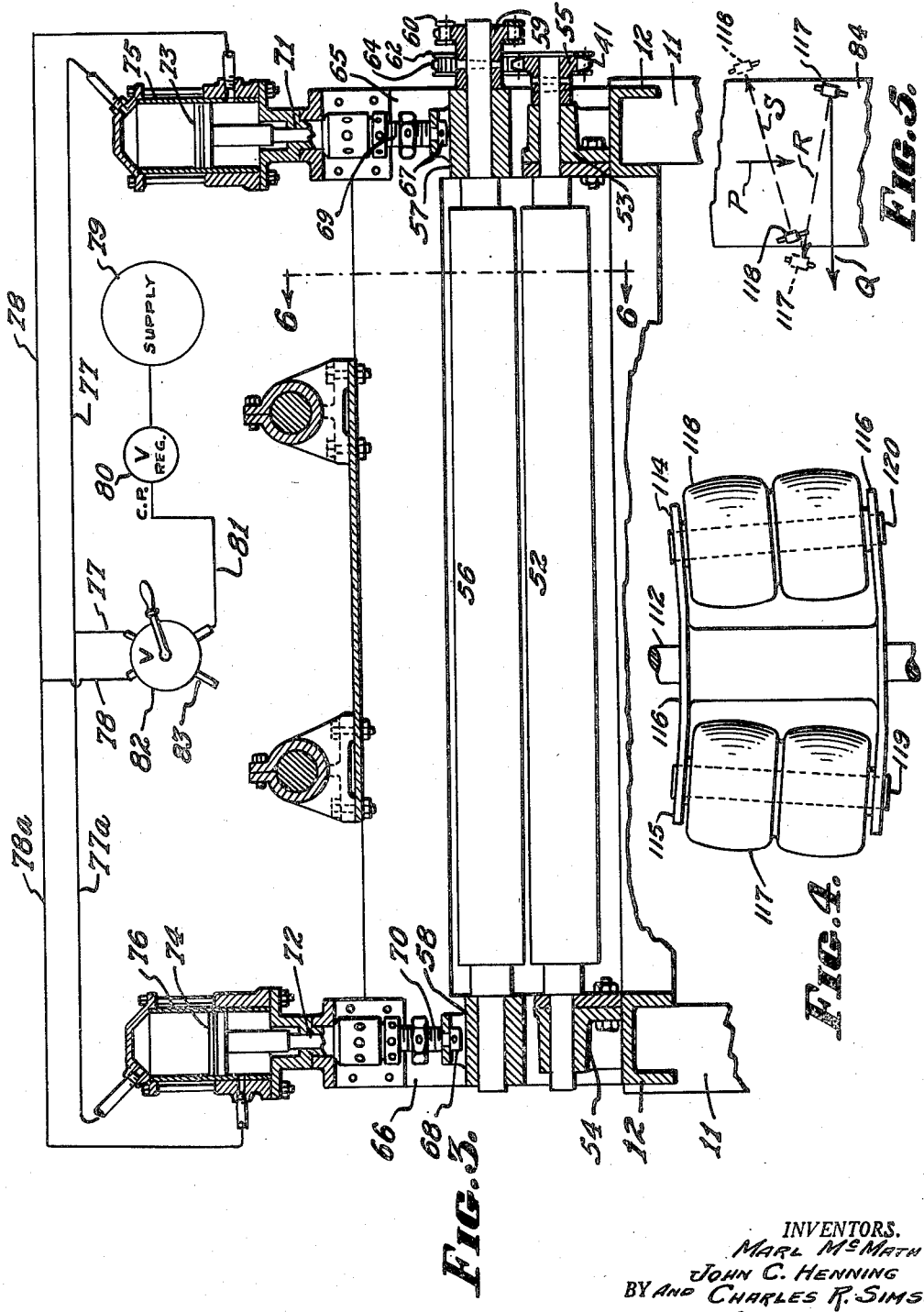

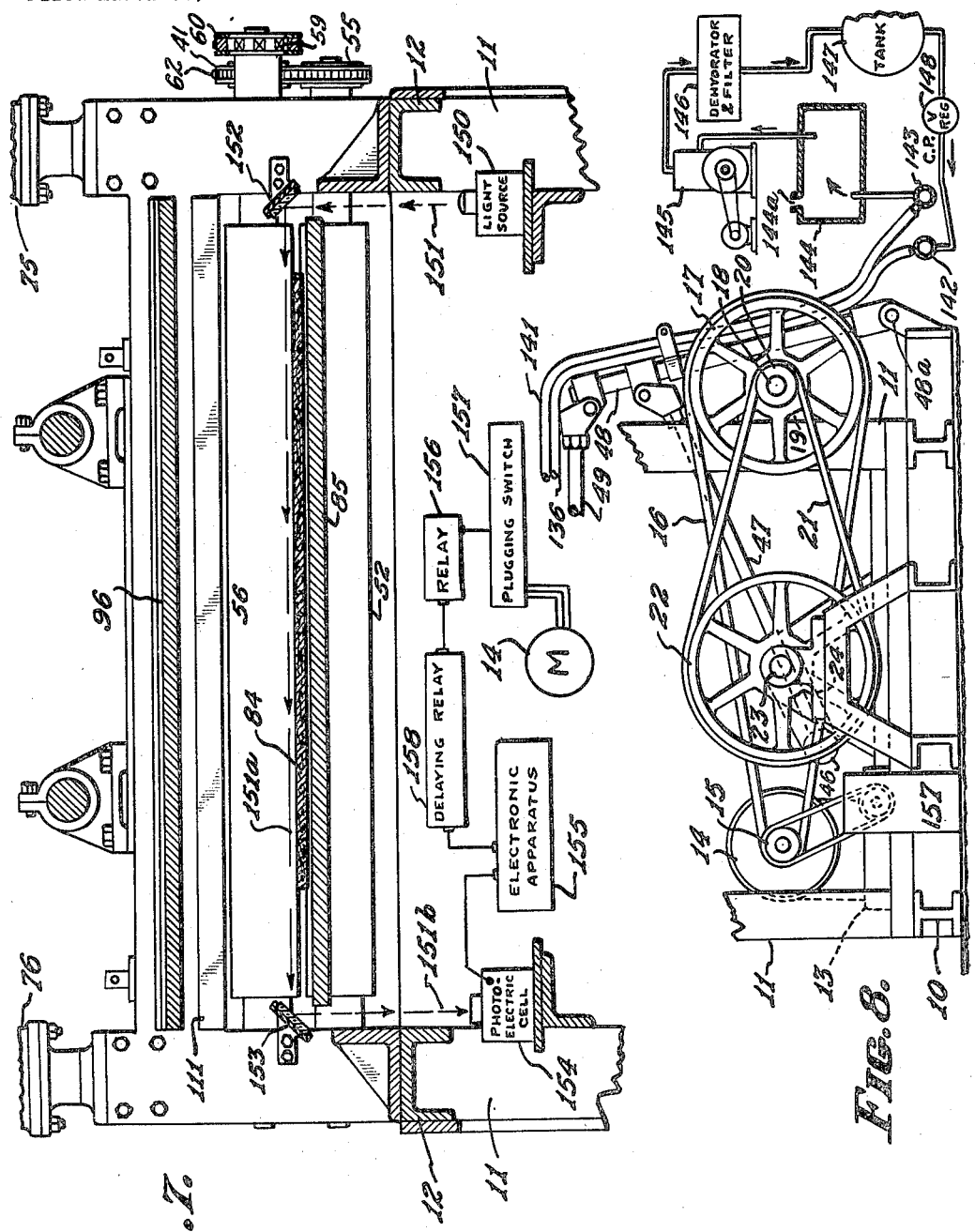

INVENTORS.
MARL McMATH
JOHN C. HENNING
AND CHARLES R. SIMS.
BY Allen Allen
ATTORNEYS.

Patented Feb. 6, 1951

2,540,132

UNITED STATES PATENT OFFICE 2,540,132

MACHINE FOR ROLLING AND SETTING LEATHER

Marl McMath, Newport, Ky., and John C. Henning and Charles R. Sims, Cincinnati, Ohio, assignors to The American Oak Leather Company, Cincinnati, Ohio, a corporation of Ohio Application March 30, 1948, Serial No. 18,036

11 Claims. (Cl. 69—46)

Our invention relates to machines for rolling and setting leather.

In the Frederick W. Henning Patent No. 2,396,421 to which reference is hereby made, there is disclosed a machine for rolling and setting leather pieces involving the use of a conveyor composed of pinch rollers for continuously feeding leather pieces, together with rolling mechanism operable crosswise at substantially a right angle to the direction of feeding movement of the leather pieces. Our invention is directed towards improvements in machines of this type.

We have found that in rolling leather pieces as they move continuously in a straight line through a machine that, while the roller heads may be moved substantially at right angles to the direction of feeding movement of the leather pieces, it is preferable to arrange the rollers at a slight angle to each other and toward the direction from which the leather pieces are fed, so that in engaging the leather pieces the slippage of the roller upon the pieces during feeding is minimized.

One improvement therefore which it is our object to accomplish, is to minimize slippage of the roller upon the leather pieces during the rolling, at the same time so arranging the feed rollers that increased feeding speeds may be maintained.

Further it is our object to provide an arrangement in which the pressure on the rolling heads may be quickly released so that when the feed conveyor is blocked the removal of the leather piece causing the blockage may be quickly accomplished.

The total extended path of travel of the heads carrying the rollers is greater than the width of the leather pieces, and since it is undesirable to excessively compress or squeeze down the edges of the leather pieces because they will not then measure up to proper gauge thickness, we provide an arrangement by which this is avoided. By the provision of two rollers, or two sets of rollers, on each head and by mounting the rollers at slightly divergent angles to the path of travel of the head and rocking the roller carriage first clockwise and then counterclockwise we are able to avoid having the rollers with rolling pressure applied engage the edges of the leather pieces, whereby compressing the edges is avoided. While a roller is rolling over the surface of a leather piece and passes across the edge, the roller does not engage the edge. It is only when the roller is approaching the edge from the other direction that we inhibit its engagement with the edge.

The foregoing objects and other objects which improve the quality of the rolling and finishing operation, which decrease the cost and which greatly increase the output and which will be described more in detail in the following description, we accomplish by that certain combination and arrangement of parts of which we have illustrated a preferred embodiment.

In the drawings:

Figure 1 is a side elevation showing the general arrangement of the machine.

Figure 2 is a fragmentary elevational view taken from the left side of the machine as shown in Figure 1, showing certain details of the driving means.

Figure 3 is a sectional view on an enlarged scale, taken along the line 3—3 of Figure 1 showing details and the mounting of the feed rolls.

Figure 4 is a plan view showing our improved mounting for the leather finishing rolls.

Figure 5 is a diagrammatic view showing the path of travel of the finishing rollers.

Figure 6 is an enlarged fragmentary detail view taken along the line 6—6 of Figure 3.

Figure 7 is a section as would appear along line 7—7 of Figure 6, being on a reduced scale and illustrating the principle of operation of photoelectric cells for automatically stopping the machine on occasions when the work piece has become displaced from the required path of travel or has buckled.

Figure 8 is a fragmentary elevational view taken from the right side of the machine as shown in Figure 1, showing details of the drive arrangement and pneumatic actuating mechanism.

Figure 9:
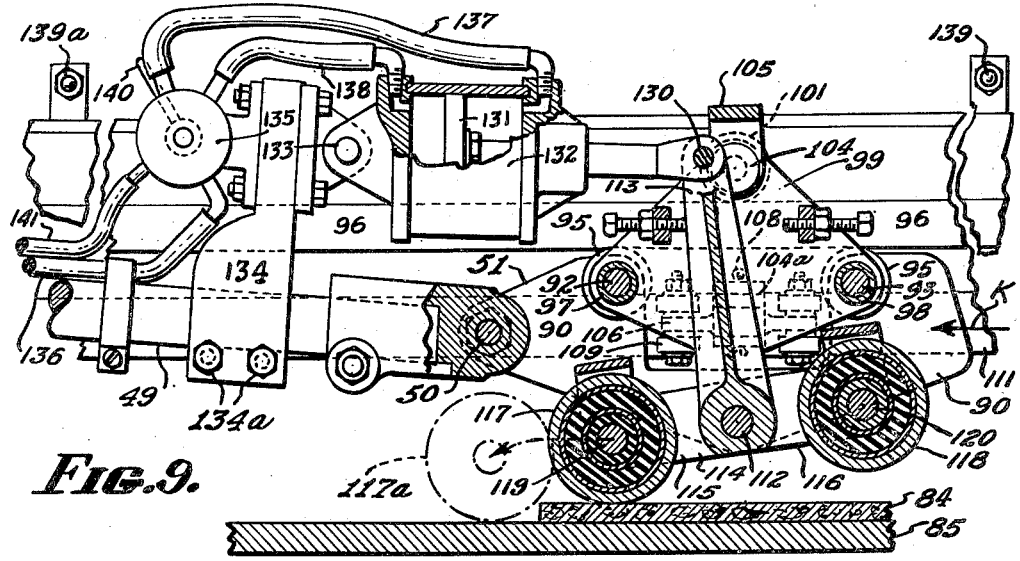
Figure 9 is a sectional view taken along the line 9—9 of Figure 6, showing a pair of leather finishing rolls and the carriage in which they are mounted.

Referring to Figure 1, the machine has a base structure generally indicated at 10. For purposes of simplifying the description, right and left as used in the following description, will refer to the right and left of the machine as shown in Figures 1 and 3.

Extending upwardly from the base 10 a series of columns 11 serve to support an elevated framework 12. Mounted upon this framework 12 there is provided a series of feed roller units, to be described later in detail and for the present purpose designated generally at A, B, C, D, E, F and G. Each feed roller unit comprises an upper and a lower roller between which the leather work pieces are engaged and advanced through the machine from left to right.

Intermediate the successive feed roller units there is arranged a series of heads carrying the finishing and setting rollers which for the present purpose are designated U, V, W, X, Y and Z, and, as will be described later in detail, are driven rapidly back and forth across the work pieces transversely to their direction of movement through the machine. The rate of speed of these heads is of the order of from 200 to 800 feet per minute. The leather pieces progress through the machine at a comparably slow rate of travel as compared to the movement of the various finishing and setting heads, for example from 20 to 40 feet per minute. The heads carrying the finishing and setting rollers comprise carriages riding in suitable tracks or guideways, these carriages having mounted therein the rollers which bear against the leather work pieces to perform the finishing and setting thereof as the heads are reciprocated back and forth across the leather pieces as they are fed along. These rollers bear upon the leather pieces with sufficient pressure to accomplish the desired compacting smoothing and polishing result.

On the base structure 10 there is mounted a platform 13 for the drive motor 14, which motor has a small drive pulley 15 over which run the multiple drive members indicated at 16.

Referring now to Figure 8, the drive members 16 engage a larger pulley 17 mounted on shaft 18, having suitable bearings 19 on the framework. Also fixed on the shaft 18 is a smaller pulley 20 engaging other multiple drive members 21 which engage the larger pulley 22.

The pulley 22 is fixed to a shaft 23, which is integrally associated with a multiple crank shaft mechanism generally indicated at 24.

The crankshaft 24 is driven, through the mechanism described, by the motor 14. However, as seen in Figure 1, the driving energy thus transmitted is applied to the right end of the crankshaft 24. Due to its various arms and to its length, it is desirable that the crankshaft also receive driving power at its left end. With this object in view, the crankshaft is provided at its left end with a large pulley 25 similar to the pulley 22 on the right. The pulley 25 is engaged by multiple driving means or belts 26.

Referring now to Figure 2, the multiple belts 26, running over the left pulley 25, are driven by a smaller pulley 27, fixed on the shaft 18. The shaft 18 extends the full length of the machine, as seen in Figure 1, and is itself driven from motor 14 as above described in connection with Figures 1 and 8.

As seen in Figures 1 and 2, the left end of the crankshaft 24 also has affixed to it a small sprocket 28. A chain 29 driven thereby rotates a larger sprocket 30. The sprocket 30 is freely rotatable on a stub shaft 31, which shaft in turn is journaled in a suitable bearing bracket 32. A friction disc 33, splined or slidably keyed to the stub shaft 31 is urged against the face of the sprocket 30 by means of a spring 34. The spring is retained on the shaft 31 by a washer 35 and an adjustable nut 36. Thus the stub shaft 31 is frictionally driven by friction disc.

The stub shaft 31 has fixed to its right end a small beveled pinion gear 37 which drives a larger bevel gear 38 fixed on the shaft 39. The shaft 39 is integral with the lower roll of the first feed roller unit. Also fixed on shaft 39 a sprocket 40 drives a chain 41, which chain travels the length of the machine to drive all of the various feed roll units as will later be described. Idler sprockets 42, 43 and 44 serve to aid in guiding the chain 41 in its path of travel.

The friction drive provided by the friction disc 33 and its associated elements, as described, serves as a safety device permitting slippage to occur if the drive roll units become clogged or otherwise overloaded.

The crankshaft 24 is mounted in a series of suitable bearing stands indicated generally at 45 and affixed to the base 10. A series of crank arms 46 are formed in the crankshaft and each arm is provided with a connecting rod 47. In Figure 8 there is clearly shown one of the crank arms 46 and its connecting rod 47. It will here be observed that the connecting rod 47 is connected to a rod or bar 48 which is itself pivoted at 48a to the base 10. Rotary motion of the crankshaft will thus cause the rod 48 to be oscillated back and forth. The rod 48 may be referred to as a rocker bar. All the other crank arms of the crankshaft 24 will be associated with similar rocker bars.

Still referring to Figure 8 the rocker bar 48 has pivotally affixed at its upper end, a driving rod 49.

Referring now to Figure 9, which is a typical sectional view through any one of the various heads carrying the finishing rollers, the driving rod 49 has pivoted attachment at 50 to the head indicated generally at 51. As will later be more apparent, the finishing head 51 (as well as all other of the various finishing heads) is mounted on suitable tracks which serve to guide it in a straight line, or rectilinear path, as it travels back and forth across the leather pieces as they are fed along.

In Figure 8 it will be apparent that the oscillating movement of the various rocker bars 48, transmitted through the drive rods 49, drive the various finishing heads in their movements back and forth across the machine at substantially right angles to the direction of feeding of the leather pieces through the machine.

The various crank arms 46, connected to the crankshaft 24, will preferably be equally spaced about the circumference of a circle. In this way vibration created by rapid reciprocation of the various heads carrying the finishing rollers, is reduced.

Referring to Figure 3, a typical detailed section through any one of the various feed roller units is shown, each feed roller unit comprising a lower feed roller 52 having journaled ends fitted in bearing blocks 53 and 54. Fixed to the lower feed roller 52 is a sprocket 55 engaged and driven by the chain 41 previously mentioned, which drives the feed roller 52. The upper feed roller 56 is journaled at its right end in a slidable bearing block 57 and at its left end in a similar slidable bearing block 58.

Fixed to the right end of this upper feed roller 56 a sprocket 59 is engaged by a chain 60 which drives the feed roller. The chain 60 is itself driven by one side of a double sprocket 62 on a stud 63 as shown in Figure 1. The double sprocket 62 is itself driven by the drive chain 41 which engages the teeth 64 and, travels a somewhat tortuous path engaging alternately a lower feed roller sprocket 55 and then running up and over one of the double sprockets 62 to drive sprockets 59 and 60, and the upper feed rollers of the various units.

Referring again to Figure 3, the slidable bearing blocks 57 and 58 are mounted in suitable guideways, or bearing stands respectively as indicated at 65 and 66. The slidable mountings of the upper feed rollers permit the lifting or lowering of any upper feed roller with respect to its cooperating lower feed roller. Thus the feed rollers may be separated or brought together as operation of the machine may require. Separation of the feed rollers is desirable in event of "jamming" or clogging of the machine by leather pieces buckling. The feed rollers are brought forcibly together with applied pressure sufficient to cause the work pieces to be firmly and positively engaged between the feed rollers and thus fed through the machine from left to right.

To accomplish the lifting or lowering of the upper feed rollers we have provided pneumatic pistons. Referring again to Figure 3, the slidable bearing blocks 57 and 58 are engaged by collars 67 and 68 respectively which are fixed to the lower ends of adjusting screws 69 and 70. The screws 69 and 70 have threaded engagement within members 71 and 72 which are integrally associated with the pistons 73 and 74. These pistons 73 and 74 are operative within suitable pneumatic cylinders 75 on the right and 76 on the left.

Referring again to Figure 1, it will be apparent that each of the feed roller units is supplied with a similar pair of the pneumatic pistons and cylinders, the front cylinder of each of the various units being shown at 75.

The various cylinders are supplied with pneumatic pressure by supply lines 77 and 78. It will also be observed that the various cylinders are connected in "multiple" so that lifting or lowering of all upper feed rolls of the various units will occur simultaneously, and it will be understood that the cooperating cylinders on the opposite side of the machine are similarly connected in multiple to supply lines to be presently described.

Referring again to Figure 3, which shows diagrammatically the arrangement of the pneumatic system, there is indicated at 79 a source or supply of compressed air. The air flowing from this source passes through a regulating valve 80 adjustable to maintain a constant desired pressure in the line 81. The line 81 is connected to valve 82. From this valve 82 the pressure may be selectively directed through either the line 77 or the line 78, as the operator desires. It will be apparent that if the pressure is directed through the line 77 it will be introduced into the upper end of cylinder 75 causing the piston 73 and its associated elements 71, 69 and 57, to be urged downwardly. Simultaneously, pressure will flow through the branch line 77a to enter the upper end of cylinder 76, causing its piston 74 and its associated elements 76, 70 and 58 to be also urged downwardly. Thus the roller 56 carried in the sliding bearing blocks 57 and 58 will be urged downwardly to engage the work pieces under pressure. It will be apparent that if the pressure is directed through the lines 78 and 78a, the pressure will flow into the lower ends of the cylinders 75 and 76 thus lifting the pistons and consequently the feed rollers 56. The valve 82 has an exhaust port 83 for the air displaced from the cylinders as the pistons are moved. It will be understood that the supply lines 77 and 78 are connected to all of the various pneumatic cylinders on the right of the machine (as seen in Figure 3) and that the lines 77a and 78a supply all of the cooperating cylinders on the left.

All of the various feed roll units are substantially similar. But preferably successive pairs of the feed rollers 52 and 56 are progressively slightly larger in diameter, so that each succeeding pair of rollers tends to advance a leather piece slightly faster than the preceding pair of rolls. The result is that each leather piece as it is fed along, is slightly stressed in its direction of travel creating and maintaining a taut and desirable condition while the finishing rolls are driven back and forth across its surface.

Figure 6 is an enlarged fragmentary sectional view through the initial feed roller units A, B and C, and elevational details of the intervening finishing heads U, V and W, are also shown. One of the leather work pieces is indicated at 84. The piece is being carried to the right as seen in this figure by the action of the feed rollers 52 and 56 of each of the units A and B. During its movement between these successive feed roller units the leather piece is supported on a rigid plate or table 85. The table 85 is reenforced by a heavy channel 86 carried in the frame of the machine. Similar tables 85 are likewise provided between each successive pair of the feed roller units. These tables coact with the various finishing heads to support the work piece as it is carried through the machine and subjected to the rolling and setting operations of the finishing rollers. As the leather work pieces emerge from each pair of the feed rollers 52 and 56, the leather may tend to curl or bend upwardly, thus deviating from the desired path of travel. To prevent this condition, guide plates or hold-down members indicated at 89 may be employed, the members 89 being fixed to the sliding bearing blocks 57 and 58 of the feed rollers 56.

The leather work pieces 84 are preferably fed manually by an operator from the table 87 into the first pair of feed rollers of the unit A. While traveling from feed unit A to unit B, the head carrying the finishing rollers generally indicated at U, reciprocates rapidly back and forth across the work to perform an initial operation of rolling and setting. While traveling from unit B to unit C the head V will reciprocate rapidly back and forth across the work piece affecting a further rolling and setting of the leather. Thus as the work is carried through the machine, the leather is progressively subjected to a complete and thorough rolling and setting operation by the operation of the various successive finishing heads. In Figure 1 the leather pieces emerge from the last pair of feed rollers in unit G, onto the receiving table 88. It is to be understood that the machine herein shown and described is not to be limited to the precise arrangement or number of the feed roll units and finishing heads disclosed and for some purposes machines with single feeding units and rolling units may be employed.

Figures 11, 12:
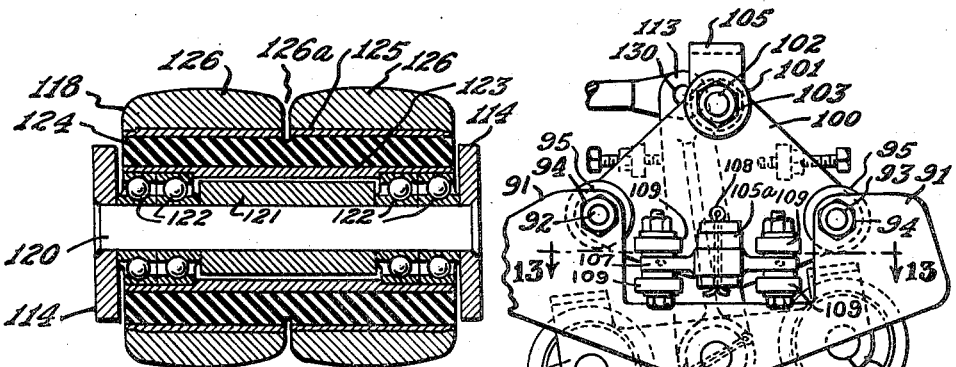
Figure 11 is an enlarged section taken along the line 11—11 of Figure 10.
Figure 12 is a side elevational view of a roller carriage.

Referring now to Figures 6, 9 and 12, each of the reciprocating drive rods 49, as previously described, are pivotally attached, as at 50, to a finishing head. The pin 50 extends between a pair of side plates 90 and 91 in which plates the pin 50 is fixed and serves as a spacer therebetween. The plates 90 and 91 are also provided with other spacing elements in the form of rods 92 and 93 which are threaded at each end to receive lock nuts 94.

Figure 13:
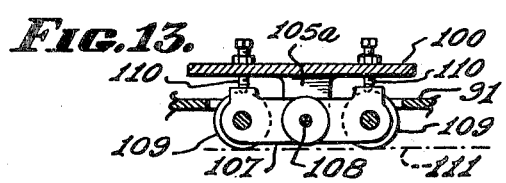
Figure 13 is a section taken along line 13—13 of Figure 12.

Mounted on the rods 92 and 93 are rollers 95 which engage the under side of track members 96, which are carried by the framework of the machine. The rods 92 and 93 have sleeves 97 and 98 respectively which sleeves serve as spacer members for a second or inner pair of plates 99 and 100. The plates 99 and 100 each carry an upper roller 101 which engages the upper side of the track member 96. As best seen in Figure 6 the rollers 101 are mounted on studs 102 which have lock nuts 103 and enlarged heads 104. The mounting diameter of the pin 102 is eccentric to the mounting of the roller bearing 101 so that when the pin is revolved the spacing of the lower roller bearing assembly is changed in relation to the upper bearing assembly so as to hold the roller snug to the rail 96. The enlarged heads 104 engage an inverted U-shaped member 105 which also serves as a spacer to aid in maintaining the required relationship between the plates 99 and 100. Welded to the plates 99 and 100 (as best seen in Figures 9, 12 and 13), there are brackets or trunnions 104a and 105a respectively. These trunnions have pivotally mounted thereto the double arm members 106 and 107 by means of pins 108. These members 106 and 107 each carry four rollers 109, best seen in Figures 12 and 13, where it will be observed that the position of member 107 and likewise the position of member 106 may be adjusted by means of the set screws 110.

The rollers 109 being mounted on vertical axes ride upon suitable side track members 111 (as seen in Figure 6), secured in the framework of the machine.

It will thus be seen that the plates 90 and 91 together with the rollers 95, plates 99 and 100, and rollers 101 form a carriage confined against undue upward or downward movement by the rollers 95 and 101 engaging the track 96. It will also be apparent that undue side movement is restricted by the rollers 109 engaging the tracks 111. Thus, as shown in Figure 9, as it is reciprocated by the drive rod 49, the carriage is guided back and forth in a straight line and confined thereto by the tracks and rollers just described.

Pivotally mounted in the side plates 90 and 91 of the carriage and extending therebetween, is a pin or stub shaft 112. The pin or stub shaft 112 is pinned, as shown at 112a in Figure 12, at each end to the side plates 90 and 91. The lever arm 113 is free to rotate on the shaft 112. Also carried on the shaft 112 is a bracket 114 having lever arms 115 and 116 each of which mounts a leather-finishing roller respectively. The bracket 114 is fixed to the lever 113 for movement therewith. The leather finishing rollers are indicated at 117 and 118, as shown in Figure 4. These finishing rollers are rotatably mounted on pins 119 and 120 carried in the bracket 114.

Figure 11 shows a preferred construction and mounting of one of the rollers. As here shown the pin 120 has a central spacer or sleeve 121 for ball bearing races 122 on each side. The ball bearings mount a rotatable sleeve 123 which in turn is affixed to, and preferably surrounded by, a heavy rubber or other resilient sleeve 124. Where a single roller is used a rubber sleeve is ordinarily not used. The resilient sleeve 124 is itself contained in a metallic sleeve 125 mounting a rim 126, which is contoured as shown and serves as the working surface for the roller. The roller illustrated in Figure 11 is a divided or "double roll," the rim 126 being cut away as at 126a. Referring briefly to Figure 6, it will be noted that the roll 118 carried by the finishing head U has a solid rim 126 not divided as the one above described. In the finishing head V there is shown one of the divided or "double rollers" having the groove 126a in its rim. It should be understood that the double roller is merely a preferred construction for the finishing rollers as single rollers may be employed in any of the various finishing heads as desired.

Referring again to Figure 9, the lever 113 which may be integrally formed with the bracket 114, and is called the roller or ball bracket, constitute a rocking assembly serving to shift either of the finishing rollers 117 or 118 into contact against the leather piece as it is fed through the machine. The shifting or rocking of the rollers is accomplished by means of a pneumatic piston, to be described, and which has a pivoted connection as at 130 to the lever arm 113.

In Figure 9 the head has advanced to a position in which the roller 117 has been rocked to position bearing upon and rolling across the leather piece as shown. The direction of travel is to the left as indicated by the arrow K. As shown, the finishing head will continue in its movement to the left so that the roller 117 will pass across the left edge of the piece 84 and occupy the position indicated at 117a. The head assembly will then continue in its movement to the left until the relative positions of the leather piece 84 and the finishing rollers approximate the relation shown in Figure 10. In this position the parts are shown at the interval when the finishing head has just completed its stroke to the left. At this instant the position of the rollers 117 and 118 is shifted or rocked by the pneumatic piston, so that the roll 118 now bears upon the work pieces as indicated in dotted lines at 118b. With the roller 117 now lifted to the position indicated in dotted lines at 117b, the finishing head begins its stroke to the right with the roller 118 bearing against the work piece. As the finishing head nears the conclusion of this stroke or travel to the right, the roller 118 will, of course, roll over and off of the right hand edge (not shown) of the leather piece. Then, as this stroke to the right is completed the position of the rolls 117 and 118 will again be shifted or rocked so that the roll 117 again bears against the work piece and, with the roll 118 lifted, the direction of travel is again reversed. Thus as seen in Figure 9 the roller 117 bears against the work piece while traveling to the left in that figure and the roller 118 bears against the work while moving to the right. It will be observed that this control of the finishing rollers avoids contact against the edge of the leather piece of a finishing roller under pressure. The finishing rollers when rolling off the edges of the leather piece do not squeeze down the edges excessively.

Referring now to Figure 4 a preferred arrangement or mounting of the finishing rollers is illustrated. It will here be noted that the rollers 117 and 118 are mounted with angular relation to each other by means of the pins 119 and 120 carried in the member 114.

Figure 10:
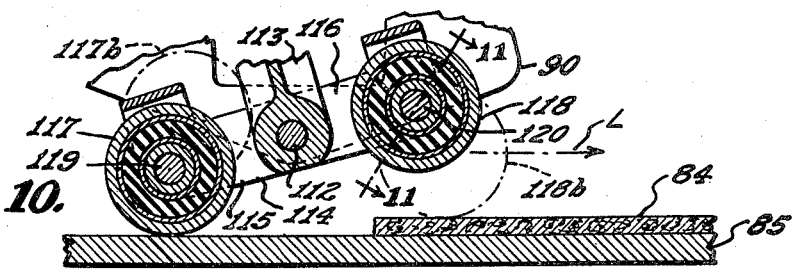
Figure 10 is a fragmentary view of the parts seen in Figure 9.

Referring to the diagrams in Figure 5 it will be observed that the work piece 84 is fed slowly in the direction indicated by the arrow P while the finishing head carrying the roller 117 moves rapidly in the direction of arrow Q. The resultant path of travel of the roller 117 across the work piece is in the direction of the line or arrow R. Thus the angular or axial mounting of the roller 117 is preferably at a right angle to this resultant path of travel and the roller therefore traverses the leather work piece with true rolling action. A minimum of said slippage of the roller across the leather surface occurs and movement of the work piece in its travel through the machine tends to be unimpeded. As the finishing head commences its return stroke or travel to the right, as seen in Figure 10, the rollers will be rocked by the pneumatic piston so that the roller 118 will be brought to bear against the work piece. The resultant path of travel of this roller is approximated by the line or arrow S, and it is to be noted that the axial mounting of the roller is again at a right angle or perpendicular to this resultant path of travel, so that true rolling action is obtained.

It will be apparent that the shifting of the rollers 117 and 118 alternately into contact with the work piece provides a true rolling action thereupon with a minimum of slippage, and that the angular mounting of these rollers as just described, and which compensate for the movement of the leather pieces, tends to bring about this true rolling action.

It will further be observed that the rocking action of the carriage carrying the finishing rollers takes advantage of a leverage principle by which the downward pressure of that finishing roller which is in contact with the work piece is greatly increased.

As best seen in Figure 9 the pneumatic piston for shifting the finishing rollers is indicated at 131. The piston is operative within a cylinder 132 which in turn is pivotally fixed at 133 to a bracket 134 itself clamped by bolts 134a to the reciprocating drive rod 49 previously described. Also carried on the bracket 134 is a suitable valve 135 for controlling movement of the piston. The valve is supplied with pneumatic pressure by supply line 136 and directs flow of the pressure to either end of the cylinder 132 either through the line 137 or the line 138. The position of the valve is controlled or shifted by means of studs or pins 139 mounted in the frame of the machine. These pins 139 on the right and 139a on the left are mounted in the path of a lever arm 140 controlling the valve 135. At the conclusion of each finishing stroke the arm 140 will strike one of these pins and will thus be shifted to affect movement of the piston.

It will be understood that each of the various finishing heads is provided with a pneumatic piston and valve 135 as just described.

Each of the valves 135 has an exhaust pipe 141 whereby the air displaced by movement of the piston 131 passes back through the line 141 to an exhaust manifold 143 as shown in Figure 8. The pneumatic supply lines 136 of the various heads will be connected to a supply manifold 142.

Figure 8 shows diagrammatically the arrangement of pneumatic apparatus employed. It will be noted that the exhaust air from the manifold 143 is directed into a receiver 144. This receiver has an opening 144a whereby air may be charged into or released from the system. The usual compressor 145, dehydrator and filter 146, pressure tank 147 and regulating valve 148 are also employed. It will be observed that, due to the receiver 144, a large part of the exhaust air, previously dehydrated and filtered, will be reemployed. Thus cleaner and drier air is maintained within the system.

As a safety measure to prevent damage to the machine and/or the leather pieces being conveyed therethrough, a series of electronic devices commonly referred to as "electric eyes" are employed.

Referring to Figure 7, there is shown a light source 150 with its beam of light 151 directed to impinge upon a mirror 152. This mirror is arranged to reflect the beam as at 151a, the beam passing just above the normal path of travel of the work pieces 84. A second mirror 153 reflects the beam as at 151b into the photoelectric cell 154. In the event the work piece 84 should become buckled, doubled over or otherwise deviated from its normal path of travel, the light beam will be interrupted, thus causing the photoelectric cell to actuate certain electronic equipment diagrammatically indicated at 155. This equipment in turn operates a relay 156 to actuate a plugging switch 157 which plugging switch throws the motor 14 into reverse effort and maintains this condition of reverse effort in the motor until the machine comes to a complete stop, whereupon the motor's source of power is broken and the entire mechanism remains at rest. Thus the motor 14 also serves as a braking device for bringing the entire machine to a quick stop before serious damage is likely to occur.

To prevent stoppage of the machine due to minor or temporary deviations of the work piece, which deviations may be of no consequence, a delaying relay indicated at 158 is employed. This relay has a dash pot arrangement (not shown) whereby its function of actuating the relay 156 is delayed. In the machine shown it has been found advantageous that the period or duration of delay thus provided should be about one second. Thus a temporary deviation of the work piece will not cause unnecessary stoppage of the machine.

A light source and a photoelectric cell will preferably be employed in conjunction with each of the feed roller units, but, of course, other types of electric systems and wiring arrangements may be employed as desired.

While the machine is particularly designed for the finishing and polishing of leather or hides, the principle of operation may be employed for rolling other material where it is desired to produce an effect akin to that produced on leather.

Alternative types of mechanism may be employed or substituted, it being understood that the principles of operation as set forth in our statement of objectives may be accomplished in other ways.

Having thus described our invention, what we claim as new and desire to secure by Letters Patent is:

1. In a power driven machine for rolling and setting leather having a series of sets of power driven pinch feed rollers between which pieces of leather are fed along flatwise, a series of cross heads carrying pressing and setting rollers operable substantially crosswise of the direction of feeding movement of leather pieces as they move from one set of feed rollers to another, and means for rocking said cross head rollers to inhibit their pressing action as they approach the side edges of leather pieces as the pieces are fed along from one set of feed rollers to another.

2. In a power driven machine for rolling and setting leather having a series of sets of power driven pinch feed rollers between which pieces of leather are fed along flatwise, a series of cross heads carrying pressing and setting rollers operable substantially crosswise of the direction of feeding movement of leather pieces as they move from one set of feed rollers to another, and means for rocking said cross head rollers to inhibit their pressing action as they approach the side edges of leather pieces as the pieces are fed along from one set of feed rollers to another, and pneumatic means for actuating said rocking means.

3. In a machine for rolling and setting leather, a series of spaced feed rollers for feeding pieces of leather flatwise through the machine, a series of cross heads carrying pressing rollers actuable crosswise of the machine in the space between each set of feed rollers, a rocking carriage on which said pressing rollers are mounted, and the rollers on each side of the pivot of the rocking carriage being mounted at such angles as will compensate and apply cross rolling pressure to leather pieces as they are fed along between the feed rollers.

4. In a machine for rolling and setting leather, a series of spaced feed rollers for feeding pieces of leather flatwise through the machine, a series of cross heads carrying pressing rollers actuable crosswise of the machine in the space between each set of feed rollers, a rocking carriage on which said pressing rollers are mounted, and the rollers on each side of the pivot of the rocking carriage being mounted at such angles as will compensate and apply cross rolling pressure to leather pieces as they are fed along between the feed rollers, and pneumatic means for actuating the rocking carriage at predetermined positions in their crosswise movement to prevent engagement against the edges of leather pieces as they are fed along.

5. In a machine for rolling and setting leather, a series of spaced feed rollers for feeding pieces of leather flatwise through the machine, a series of cross heads having rocking carriages on which spaced pressing rollers are mounted and actuable crosswise of the machine in the space between each set of feed rollers, said spaced pressing rollers mounted one on one side of the pivot of the carriage and the other on the other side at slight angles to the crosswise direction of movement of said cross heads to apply rolling pressure without slippage as the pieces of leather are fed along.

6. In a machine for rolling the setting leather, a series of spaced feed rollers for feeding pieces of leather flatwise through the machine, a series of cross heads having rocking carriages on which spaced pressing rollers are mounted and actuable crosswise of the machine in the space between each set of feed rollers, said spaced pressing rollers mounted one on one side of the pivot of the carriage and the other on the other side at slight angles to the crosswise direction of movement of said cross heads to apply rolling pressure without slippage as the pieces of leather are fed along, and pneumatic means for actuating said rocking carriages.

7. In a machine for rolling and setting leather, power driven spaced pinch feed rollers for feeding leather flatwise, a cross head having a rocking carriage on which spaced pressing rollers are mounted said cross head actuable crosswise of the machine in the space between the feed rollers, means for actuating said rocking carriage to cause elevation and depression of said pressing rollers so as to avoid edge compression of a moving leather piece by edge contact with a pressure roller under pressure.

8. In a machine for rolling and setting leather, power driven spaced pinch feed rollers for feeding leather flatwise, a cross head having a rocking carriage on which spaced pressing rollers are mounted said cross head actuable crosswise of the machine in the space between the feed rollers, means for actuating said rocking carriage to cause elevation and depression of said pressing rollers so as to avoid edge compression of a moving leather piece by edge contact with a pressure roller under pressure, and pneumatic means controlling said actuating means.

9. In a leather rolling and setting machine, means for continuously feeding a piece of leather through the machine and means for applying rolling pressure to the piece widthwise across the piece as it is fed lengthwise, said means comprising pressure rollers arranged at such angles as to compensate for movement of the piece during the application of rolling pressure without side slippage.

10. In a leather rolling and setting machine, means for continuously feeding a piece of leather through the machine and means for applying rolling pressure to the piece widthwise across the piece as it is fed lengthwise, said means comprising pressure rollers arranged at such angles as to compensate for movement of the piece during the application of rolling pressure without side slippage, and means for elevating the pressure rollers to avoid edge contact with the leather piece.

11. In a leather rolling and setting machine, means for continuously feeding a piece of leather through the machine and means for applying rolling pressure to the piece widthwise across the piece as it is fed lengthwise, said means comprising pressure rollers arranged at such angles as to compensate for movement of the piece during the application of rolling pressure without side slippage, and said means for applying rolling pressure pneumatically actuable.

MARL McMATH.
JOHN C. HENNING.
CHARLES R. SIMS.

REFERENCES CITED

The following references are of record in the file of this patent:

UNITED STATES PATENTS

| Number | Name | Date |
|---|---|---|
| 2,332,573 | Hibschman | Oct. 26, 1943 |
| 2,396,421 | Henning | Mar. 12, 1946 |